United States Patent Office 2,942,258
Patented June 21, 1960

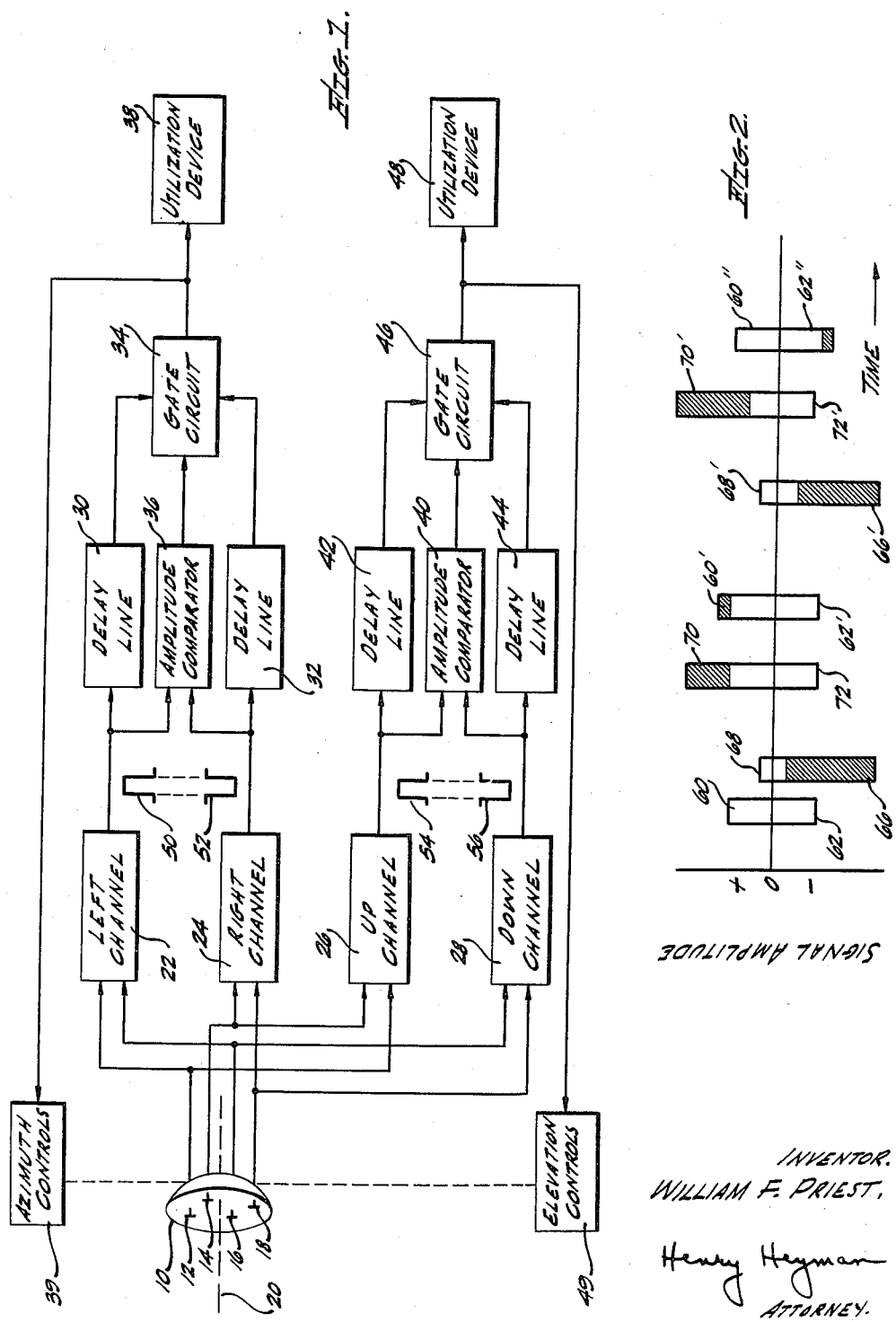

2,942,258
SELF-SELECTIVE GATING SYSTEM FOR TARGET SEEKING RECEIVER

William F. Priest, Venice, Calif., assignor to Hughes Aircraft Company, Culver City, Calif., a corporation of Delaware Filed Apr. 29, 1954, Ser. No. 426,540

6 Claims. (Cl. 343—117)

This invention relates to radar receivers for scanning and tracking a target in response to signals received from the target, and more particularly to means for selectively operating a receiver so that the direction of a single target can be determined by means of a single pulse reflected or transmitted from the target.

Certain receivers are adapted to respond to a single pulse from a target to derive information about its bearing; they are so-called monopulse receivers. A plurality of fixed, directional antennas are spaced about an axis to scan the region in which the target is located. The antennas are electrically interconnected so that separate azimuth and elevational signals will be developed in respective receiver channels. The respective signals represent the bearing of the target in azimuth and in elevation with respect to the scan axis, and they also represent the orientation of the antennas required to place the target on the scan axis.

Monopulse receivers of the type heretofore known are employed in radar systems wherein the selected target is illuminated by a pulse of microwave energy, and the receiver is made to operate during the expected time of arrival of the reflected or echo pulse. Thus, although such a receiver is capable of determining much information during a single pulse, it has been restricted to operation in response to echo signals which have expected times of arrival.

It is an object of this invention to provide a receiver which can determine the bearing of a target in response to individual pulses which have no known times of arrival.

It is another object of this invention to provide means by which a monopulse radar receiver selects only signal pulses reflected or transmitted from a target which is located in a predetermined direction.

It is a further object of this invention to provide a self-gating system for a monopulse receiver, wherein the receiver is maintained highly selective to signals in only one direction, and in which there s no necessity for complicated circuits to determine the times of arrival of signal pulses from a target.

Briefly, in accordance with this invention, the azimuth and elevation signals are derived from respective pairs of signal channels. The azimuth signal channels derive a pair of signals, opposite in polarity, determinative of whether the target is to the right or left of the scan axis. Similarly, the elevation signals comprise signals of opposite polarity which, when combined, determine whether the target is above or below the scan axis. The respective signals in each channel are compared and applied to a gating circuit, the operation of which is affected only when the respective signals are substantially equal or only slightly different in magnitude. Thus, the receiver responds only to signals from a target which is within a well-defined region about the scan axis. Signals from targets outside this region will be of sufficiently unequal amplitude that the gating circuit will be maintained inoperative. Such a receiver is adapted to track signals transmitted from a selected target, as well as echo pulses reflected from the target.

The novel features which are believed to be characteristic of this invention, both as to its organization and method of operation, together with further objects and advantages thereof, will be better understood from the following description considered in connection with the accompanying drawing, in which a preferred embodiment of the invention is illustrated by way of example. The scope of the invention is pointed out in the appended claims. In the drawing, Fig. 1 is a block diagram illustrating a monopulse type radar receiver having self-gating features, in accordance with this invention; and Fig. 2 illustrates pulses received from different targets, and is used to explain the operation of the receiver of Fig. 1.

Referring to the drawing, which is made a part of this specification, and referring more particularly to Fig. 1, an antenna reflector 10 supports four antenna elements 12, 14, 16 and 18. The antenna elements 12, 14, 16 and 18 are equally spaced from the axis 20 of reflector 10. Two of the antenna elements 12, 14 are horizontally aligned above the axis 20, and the other two antenna elements 16, 18 are similarly aligned below the axis. Thus arranged, and as viewed from the front of reflector 10, two of the antenna elements 12, 16 are also vertically aligned at the left of axis 20, and two elements 14, 18 are vertically aligned at the right of axis 20.

The antenna elements are connected in appropriate pairs to receiver circuits which develop signals representative of the strength of the received signals impressed thereon. To this end, the vertically aligned antenna elements 12, 16, as illustrated schematically, supply signals to a left receiver channel 22, and the other vertically aligned antenna elements 14, 18 feed signals to a right channel 24. Similarly, the upper horizontally aligned antenna elements 12, 14 are coupled to an up channel 26 and the lower horizontally aligned antenna elements 16, 18 are coupled to a down channel 28. The left and right channels 22, 24 are connected through respective delay lines 30, 32 to a gate circuit 34. Left and right channels 22, 24 are also connected to an amplitude comparator 36. As will be explained more fully hereafter, comparator 36 controls the operation of the gate circuit 34, the output of which is connected to a utilization device 38 and to azimuth control means 39. Azimuth controls 39 are mechanically linked to reflector 10 to impart horizontal rotation to the reflector.

The up and down channels 26, 28 are similarly connected to an amplitude comparator 40 and also through respective delay lines 42, 44 to a gate circuit 46. The output of comparator 40 controls the operation of gate circuit 46, which is connected to a utilization device 48 and to elevation controls 49. Elevation controls 49 is mechanically linked to reflector 10 to effect its vertical rotational movement.

The operation of the receiver system will now be explained for response to signal pulses transmitted from a target. The respective pairs of channels 22, 24 and 26, 28 operate in the same manner; hence, only the operation of the left and right channels 22, 24 will be described.

It is assumed that it has been determined, as by means of conventional frequency-scanning equipment, that the target transmits at a frequency within the frequency band of the receiver channels 22, 24, 26, 28. It is further assumed that the reflector 10 has been "pointed" at the target, so that the target is within a predetermined small region about the scan axis 20.

The antenna elements are arranged so that their field intensity patterns cause a signal from a target that is to the left of the scan axis to be received by antenna elements 12, 16 with greater intensity than by the antenna elements 14, 18. Further, if the target is on the scan axis 20, the signals will be received with equal intensity by the respective pairs of antenna elements 12, 16 and 14, 18. The left and right receiver channels 22, 24 are adapted to develop output signal pulses which represent the intensity of the signal pulses impressed upon the corresponding antenna elements. Further, the signals from these channels are of opposite polarity.

Amplitude comparator 36 is adapted to prevent gate circuit 34 from operating when the signals from the respective channels 22, 24 exceed a predetermined difference in amplitude. The limit of amplitude difference corresponds to the boundary of the desired region in which the selected target is located. The delay lines 30, 32 provide sufficient delay for the signals from the corresponding channels to permit the comparator 36 to properly condition gate circuit 34 for operation. Amplitude comparator 36 may comprise any suitable detector circuits to which signals of opposite polarity can be applied simultaneously, and which develop a bias control signal to keep gate circuit 34 nonconductive in the presence of signals which exceed predetermined difference in amplitudes. Gate circuit 34 may be a conventional amplitude discriminator circuit adapted to develop an output error signal which represents the difference in magnitude between the signals applied thereto. It is to be noted that the gate circuits 34 and 46 are controlled to pass only pulses such as 50 and 52 which have an amplitude difference less than a predetermined amount. These signals fall within a corresponding predetermined angle. Thus the system of this invention performs what may be called angle gating. That is, the signals from targets outside of a desired angle formed between the path of the pulses received by the antenna 10 and the scan axis 20 are gated out or blocked from the system. Thus, the system responds in both azimuth and elevation to the angular variation of the target to pass only those signals received from a target which is within a maximum angular variation from the scan axis 20.

Where the signals from channels 22, 24 are of different amplitudes, but such difference is within the accepted tolerance, gate circuit 34 develops an error signal which represents the difference. The utilization device 38, which may include a recorder or indicator, operates in accordance with such error signal. Azimuth controls 39 responds to the error signal to rotate the reflector 10 horizontally to reduce the difference in amplitude of the signals to zero. When the signals are of equal amplitude, as illustrated by pulses 50, 52, the target is in a vertical plane that includes the scan axis 20, a condition indicated by a reference or zero signal output from gate circuit 34.

It will be apparent that the above described operation is predicated upon the pulses from various targets arriving at different times; as a practical matter, this will be so in general. Should signals from different targets arrive simultaneously, they will combine at the receiver so that the resulting amplitude difference will prevent gate circuit operation. Where the signals from the desired target arrive simultaneously with those from an undesired target, they will be rejected. This would be merely a transitory occurrence, but one which might arise where the targets employ such countermeasures as "jamming." In this event, the system of this invention is rendered insensitive to the interfering signals.

Fig. 2 illustrates azimuth-indicating pulses from three targets within the field of scan, wherein the selected target is in the desired center portion of the scanned region. Referring to Fig. 2, wherein shaded portions represent the differences in magnitudes between associated positive and negative pulses, signals from the selected target are illustrated by positive pulses 60, 60', and 60", which are developed by left channel 22, and negative pulses 62, 62', and 62" which right channel 24 develops.

Positive pulse 60' is greater in magnitude than negative pulse 62' by the amount indicated by the shaded portion, and indicates that the selected target is slightly to the left of scan axis 20. Similarly, the negative pulse 62" is greater than positive pulse 60" as indicated by the shaded portion of pulse 62", and this represents the situation for the selected target slightly to the left of scan axis 20. The gate circuit 34 develops error signals to effect appropriate horizontal motion of the reflector 10 so that the signals from the channels 22, 24 will be equal in magnitude.

For a second target which is to the right of the scan axis 20 and outside the desired center portion of the scanned regions, right channel 24 develops negative pulses 66, 66' which are too much greater in magnitude than positive pulses 68, 68' developed by left channel 22. For a third target which is too far to the left of scan axis 20, the left channel 22 develops positive pulses 70, 70' which are too much greater in magnitude than negative pulses 72, 72' developed by the right channel 24. In these instances, comparator 36 keeps gate circuit 34 inoperative. Thus, signals from the undesired targets are effectively eliminated or ignored.

The conditions illustrated in Fig. 2 similarly exist in connection with the up and down channels 26, 28. Those signals received from undesired targets too far above and below the scan axis are ignored, while control action of elevation controls 49 is maintained to track a selected target which is within the desired center portion of the scanned region.

It should be noted that it is not necessary that signals from the desired target be in the form of pulses. It will be obvious that the same selectivity can be realized where the desired target transmits continuous-wave signals.

From the foregoing, it is clear that there has been described an improved object-tracking receiving system, wherein a single target can be tracked, though many targets may be present in the same vicinity.

What is claimed is:

1. A receiver for tracking a target from which a single pulse of electromagnetic energy is received comprising: means for scanning the region in which said target is located; receiving means coupled to said scanning means to derive first and second pairs of signals, said first pair of signals having a difference in amplitude which represents the direction of horizontal displacement of said target from the center of said region, said second pair of signals having a difference in amplitude which represents the direction of vertical displacement of said target from the center of said region; first and second amplitude comparators; means coupling said receiving means to said first and second amplitude comparators to impress said first and second pairs of signals respectively upon said first and second amplitude comparators; first and second gate circuits adapted to receive said first and second pairs of signals, respectively, first and second pairs of delay means, said delay means coupling said first and second gate circuits respectively, to said receiving means, said amplitude comparators being adapted to control the operation of the respective gate circuits prior to the arrival of the delayed first and second signal pairs to effect their operation only when the signals of said first and second pairs of signals have less than a predetermined maximum difference in amplitude, said gate circuits, when operating, being effective to develop respective error signals representative the differences in amplitude of said first and second pair of signals.

2. In a monopulse object-tracking receiver having to scan a region in which a desired target is located, wherein receiver networks are coupled to scanning means to derive a first pair of signals having a difference in amplitude which represents the vertical displacement of said target with respect to the axis of the scanned region, and wherein receiver networks are coupled to said scanning means to derive a second pair of signals having a difference in amplitude which represents the horizontal displacement of said target with respect to said axis, a self-gating system for said receiver comprising: first and second amplitude comparison networks, said first amplitude comparison network being connected to said receiver networks fom which said first pair of signals is derived, said second amplitude comparison network being connected to said receiver networks from which said second pair of signals is derived, a first and second gate circuit, said first and said second gate circuits being adapted to have said first and second pair of signals impressed thereon, respectively, a first and second pair of delay networks, said first pair of delay networks connecting said first gate circuit to said first amplitude comparison networks; said second pair of delay networks connecting said second gate circuit to said second amplitude comparison network; said gate circuits, respectively, being adapted to develop error signals representative of the differences in amplitude of said first and second pairs of signals; and said first and second amplitude comparison networks controlling the operation of said first and second gate circuits to restrict their operation only in the presence of signals less than a predetermined difference in amplitude said delay networks delaying said first and second pairs of signals sufficiently to permit the controlling of said first and second gate circuit by the undelayed first and second pairs of signals.

3. A receiver for tracking a selected target within a region comprising: scanning means having a scan axis, said scanning means being adapted to be pointed to place a selected target in a predetermined center portion of said region, said scanning means including a plurality of antenna elements spaced about said axis to scan said region, means interconnecting said antenna elements to derive respective signals representative of the bearing of targets in said region with respect to said scan axis; respective receiver networks to receive said signals, said receiver networks being connected to said interconnecting means whereby said signals are applied to said receiving networks; respective delay means coupled to said receiver networks, respective error signal developing means coupled to said delay means to develop azimuth and elevation error signals; and comparator means connected between said receiver and said error signal developing means to permit said error signal developing means to operate only in response to signals received from a said predetermined center portion of said selected region, said delay means delaying the arrival of said signals at the error signal developing means until said comparator means have operated upon said signal developing means.

4. A receiver for tracking a selected target comprising: means for scanning a region; receiving means coupled to said means for scanning to derive, for signals from each target, first and second pairs of signals having respective differences in amplitude which represent the direction of horizontal and vertical displacement of the targets from the center of the scanned region; first and second signal comparing means; first and second gating means; first and second pairs of delay means; said first pair of gating means coupled to said first delay means, said first comparing means and said first delay means both being coupled to said receiving means to receive said first pair of signals, said first comparing means also being coupled to said first gating means; said second pair of gating means coupled to said second delay means; said second comparing means and said second delay means being coupled to said receiving means to receive said second pair of signals, said second comparing means also being coupled to said second gating means; said first and second comparing means being effective to control the operation of the respective gating means prior to the arrival of said first and second pairs of signals which have passed through said first and second pairs of delay means, said first and second comparing means effecting the operation of the respective gating means only when the signals of said first and second pairs of signals have less than a predetermined difference in amplitude, said first and second gating means being effective to derive error signals which represent said differences in amplitude.

5. An object-tracking receiver capable of monopulse operation for tracking a selected one of a plurality of targets comprising: means for scanning a region wherein there is located said plurality of targets from which signals are received; said scanning means having a directional axis; receiving means coupled to said scanning means to derive, for signals received from each of said targets, first and second pairs of signals having respective differences in amplitude which represent the direction of horizontal and vertical displacement of the targets from said directional axis; respective delay means coupled to said receiving means; respective error signal deriving means coupled to saidd elay means to derive respective error signals representative of said differences in amplitude; and respective signal comparing means coupled directly to said receiving means to derive control signals to control the operation of said error signal deriving means so that delayed said first and second pairs of signals are not transmitted through said error signal deriving means except where said respective differences in amplitude are less than a predetermined upper limit; said upper limit being the maximum difference in amplitude of said first and second pairs of signals receivable from said selected target, whereby only the signals from said selected target effect operation of said respective error signal deriving means for deriving said respective error signals.

6. A receiver for forming directional error signals in relation to a target by responding to a single pulse of received energy comprising: a directional reflector with antenna elements arranged around an axis; receiving means connected to said antenna elements to form a plurality of pairs of signals, the difference in amplitude of each pair of signals representing the angular variation of said target from said axis in one direction through said axis; gating means for each pair of signals; delay means for each signal to connect said receiving means to said respective gating means; and amplitude comparison means for each pair of signals to open the respective gating means only when the difference in amplitude of said pairs of signals is less than a maximum difference, said maximum difference representing a desired maximum angular variation of said target from said axis, and each of said gating means when opened developing said directional error signals from said respective pairs of signals.

References Cited in the file of this patent

UNITED STATES PATENTS

| | | |
|---|---|---|
| 2,423,104 | Labin | July 1, 1947 |
| 2,426,218 | Hopgood | Aug. 26, 1947 |
| 2,509,207 | Busgnies | May 30, 1950 |
| 2,516,356 | Tull | July 25, 1950 |
| 2,536,346 | Bradley | Jan. 2, 1951 |
| 2,541,276 | Oliver | Feb. 13, 1951 |
| 2,703,399 | Williams | Mar. 1, 1955 |

FOREIGN PATENTS

| | | |
|---|---|---|
| 600,502 | Great Britain | Apr. 12, 1948 |